(12) United States Patent
Grande

(10) Patent No.: US 8,526,595 B2
(45) Date of Patent: Sep. 3, 2013

(54) AUTO-DIALER BLOCKING ON NETWORK

(75) Inventor: James S. Grande, Rowlett, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 900 days.

(21) Appl. No.: 12/454,894

(22) Filed: May 26, 2009

(65) Prior Publication Data

US 2010/0303215 A1    Dec. 2, 2010

(51) Int. Cl.
*H04M 7/00* (2006.01)

(52) U.S. Cl.
USPC ............... 379/224; 370/216; 370/229; 379/8; 379/9; 379/32.01; 379/229; 709/201; 709/223

(58) Field of Classification Search
USPC ................. 370/259–271, 351–357, 216–253; 709/201–207, 217–248; 379/219–349, 1.01–35
See application file for complete search history.

(56) References Cited

U.S. PATENT DOCUMENTS

| | | | | |
|---|---|---|---|---|
| 4,885,780 A * | 12/1989 | Gopal et al. | | 379/221.01 |
| 4,953,204 A * | 8/1990 | Cuschleg et al. | | 379/266.05 |
| 5,291,552 A * | 3/1994 | Kerrigan et al. | | 379/266.04 |
| 5,311,583 A * | 5/1994 | Friedes et al. | | 379/210.01 |
| 5,574,977 A * | 11/1996 | Joseph et al. | | 455/450 |
| 5,724,419 A * | 3/1998 | Harbuziuk et al. | | 379/266.04 |
| 5,740,234 A * | 4/1998 | Black et al. | | 379/112.01 |
| 5,995,848 A * | 11/1999 | Nguyen | | 455/528 |
| 6,275,572 B1 * | 8/2001 | Higuchi et al. | | 379/111 |
| 6,459,902 B1 * | 10/2002 | Li et al. | | 455/453 |
| 6,714,643 B1 * | 3/2004 | Gargeya et al. | | 379/266.06 |
| 7,013,129 B2 * | 3/2006 | Goss et al. | | 455/414.1 |
| 7,180,888 B1 * | 2/2007 | Crouch et al. | | 370/352 |
| 7,730,201 B1 * | 6/2010 | McAllister et al. | | 709/233 |
| 7,768,917 B2 * | 8/2010 | Nakayama et al. | | 370/230.1 |
| 8,135,418 B2 * | 3/2012 | Ranganathan et al. | | 455/458 |
| 2004/0111513 A1 * | 6/2004 | Shen | | 709/226 |
| 2005/0227718 A1 * | 10/2005 | Harris et al. | | 455/509 |
| 2006/0002373 A1 * | 1/2006 | Denny | | 370/352 |
| 2006/0245550 A1 | 11/2006 | Ferguson et al. | | |
| 2007/0233896 A1 * | 10/2007 | Hilt et al. | | 709/238 |
| 2007/0291925 A1 | 12/2007 | Goldman et al. | | |
| 2010/0097927 A1 * | 4/2010 | Croak et al. | | 370/220 |

* cited by examiner

*Primary Examiner* — Hemant Patel

(57) ABSTRACT

A method and platform for reducing call blocking in a telecommunications network addresses problems caused by the use of auto-dialers and by mass calling events in the network. When a capacity excess is detected, information associated with excess calls, such as the Initial Address Message (IAM), is stored in an incoming call cache memory. A message may be played to the caller informing the caller of the status of the message. Once additional call capacity is open, the call is connected using the call information stored in the cache. The calls may be removed from the cache and connected on a first-in, first-out basis.

20 Claims, 3 Drawing Sheets

AUTO-DIALER BLOCKING ON NETWORK

FIELD OF THE INVENTION

The present invention relates generally to the management of call capacity in a telecommunications network. More particularly, the present application relates to methods and systems for handling a surge of calls in excess of the capacity of a network element, as is often caused by the use of auto-dialers. The method and system reduce the number of calls that are blocked or dropped as a result of exceeding the capacity of the network element.

BACKGROUND OF THE INVENTION

Call blocking occurs when switching or transmission capacity in a network is not available at the time that a caller attempts to place a call. The lack of capacity that causes a call to be blocked may be located in many places in the network: the caller's own telephone switch, the caller's central office or in switches or transmission media in the long distance network. A blocked call may result in a caller receiving a "busy" signal, or in the call simply "hanging."

The rate of call blocking in a network is a metric used in describing the grade of service of the network. Businesses often subscribe to communications services having a guaranteed maximum blocking rate, and are willing to pay for that enhancement. Communications network designers must therefore take into consideration a tradeoff between expense and grade of service. The expense of reducing blocked call rates typically increases at a greater rate as the number of blocked calls is reduced.

Telecommunications services providers have traced the occurrence of some blocked calls to the use of auto-dialers causing temporary congestion in the network. An auto-dialer is a device that attempts to establish telephone connections with each of a plurality of numbers in a list, or with a series of generated telephone numbers. Auto-dialers are typically used by telemarketers, public entities, etc. and are used in sending out or 'call-blasting' sometimes thousands of customers with pre-recorded messages for contests, surveys, emergency notifications, etc. The connection attempts are made in rapid succession, and may appear to the network to be effectively simultaneous. If the connection attempts are directed through a single network element such as a switch, the element capacity may be exceeded, resulting in the excess calls being blocked.

The problem of call blocking caused by auto-dialers is aggravated by the fact that disconnected numbers often remain on circulation databases longer than necessary. When auto-dialers attempt connections to a large number of discontinued telephone numbers, the intercept process consumes additional network resources and can itself result in additional blocked calls.

The use of auto-dialers and the occurrence of other mass calling events have resulted in increased blocking to be reported on various industry metrics and reports. Network operating companies are frequently rated on those metrics. The existence of those blocked calls may impair the ability of a company to guarantee that a dropped call rate will remain below a maximum number.

There has been a tremendous growth in the VoIP arena and a corresponding increase in call blocking of those calls. It is believed that the trunk groups handling VoIP calls have not been sized properly from the beginning.

In some computer networks, certain routers have an extra interface that automatically comes on when traffic gets too high on the primary interface. In telecommunications networks, an alternate route may be provided on switch or tandem equipment, serving a similar purpose. A problem inherent to that solution is that the alternate route can only handle so much traffic; thereafter, the alternate route begins to block traffic as well.

There is therefore a need for a technique and system for reducing call blocking in a telecommunications network.

SUMMARY OF THE INVENTION

The present invention addresses the needs described above by providing a method for reducing call blocking of calls that exceed a capacity of a network element in a telecommunications network. The method comprises the steps of detecting incoming traffic in excess of the capacity of the network element; in response to the detection, in a computer, storing call routing information of an incoming call in an incoming call cache memory; determining that capacity exists in the network element to connect the incoming call; and connecting the incoming call using the stored call routing information.

Another embodiment of the invention is an anti-blocking platform for reducing call blocking of calls that exceed a capacity of a network element in a telecommunications network. The platform comprises a call congestion detector for detecting incoming traffic in excess of the capacity of the network element; an incoming call cache memory; and a cache manager. The cache manager includes a processor and a computer-usable medium having computer readable instructions stored thereon for execution by the processor to perform a method comprising: receiving from the call congestion detector an indication that incoming traffic exceeds the capacity of the network element; storing call routing information of an incoming call in the incoming call cache memory; determining that capacity exists in the network element to connect the incoming call; and, based on determining that capacity exists, connecting the incoming call using the stored call routing information.

DESCRIPTION OF THE INVENTION

To overcome the problem of call blocking resulting from surges in call volume, the system and method of the present invention use a cache memory to temporarily store overflow calls. The overflow calls are "cached" based on certain parameters, such as reaching a certain peak number of calls or filling the alternate route(s) to capacity. Once in the cache, the calls are dealt with as system resources become available and sent on to completion. The cache has the effect of slowing down the rate at which calls must be connected.

Figure 1:
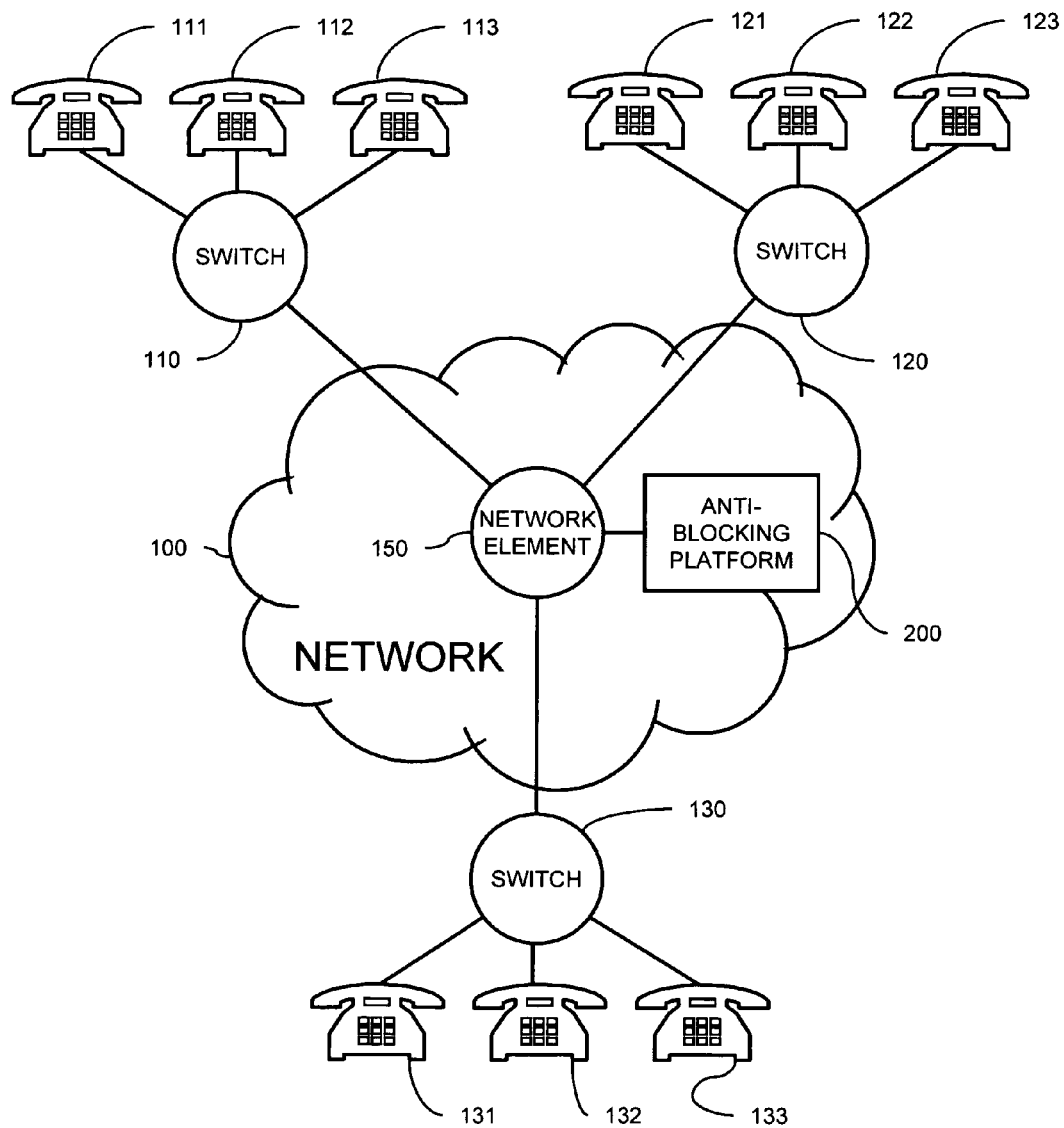
FIG. 1 is schematic diagram of a communications network, according to one embodiment of the invention.

A telecommunications network in accordance with the invention is shown in FIG. 1. Telephone stations 111, 112, 113 are connected through a switch 110 to a communications network 100 such as the Public Switched Telephone Network (PSTN), or a Voice over Internet Protocol (VoIP) network. The switch 110 may be in a central office of a local carrier (not shown). Other telephone stations 121, 122, 123 are connected through switch 120, and stations 131, 132, 133 are connected through switch 130. While the switches 110, 120, 130 are each shown connecting three stations, one skilled in the art will recognize that this is merely illustrative, and that a much larger number of stations may be connected through a single switch.

In one example, switching in the switch 110 is performed using an out-of-band signaling system such as ITU Signaling System 7 (SS7). As part of the call set-up protocol, an Initial Address Message (IAM) is sent in the forward direction from the switch 110 to the network 100. The IAM contains information relating to the routing and handling of the call, including destination address information and calling number identification.

Under normal circumstances, the IAM initiates seizure of outgoing circuits to establish a connection from an originating station to a terminating or destination station. The call is thereby connected to the target address or called telephone number of a called station. For example, a call originating in station 111 and having a destination address corresponding to station 131 may be transmitted by the switch 110 to the network 100. The call includes an out-of-band IAM message containing call routing and handling information. Based on the information contained in the IAM, the call is set up through the network element 150, and switch 130 to the destination station 131.

In one exemplary embodiment of the invention, the network element 150 is a tandem switch office, a network element that is frequently a cause of call blocking. For example, an auto-dialer may begin calling numbers in Austin, Tex. If call blocking occurs, it would show up on the Austin tandem switch.

While the invention has been described above with reference to a circuit-switched PSTN, the network 100 may alternatively be a packet-switched VoIP system wherein packets contain destination addresses and originating addresses are routed through the network by routers. In that case, the network element 150 is a router that sends the packets based on the routing information contained in them.

Before a call is connected, the initial set-up request, including the routing or call set-up information, must be processed by one or more resources in the network, such as network element 150. Network element 150 may be a switch, router, transmission facility or other network element having a finite capacity. If the capacity of the network element 150 is reached or exceeded at the time a call or packet arrives at the element, that call may be a dropped; i.e., a connection is not established and the call set-up request is simply discarded. While telecommunications networks are typically designed to accommodate spiking in the volume of calls, the operation of an auto-dialer by an originating station can create call volume that exceeds even the designed-for spike, causing calls at the overloaded network element to be dropped.

In accordance with the present invention, an anti-blocking platform 200 is associated with the network element 150. While the anti-blocking platform 200 is shown in association with only a single network element 150, one skilled in the art will recognize that a single platform may be associated with multiple elements. Alternatively, a plurality of anti-blocking platforms 200 may be associated with a single network element. In the case wherein the network element 150 is a tandem switch office, the anti-blocking platform 200 may be in or on one or more switches in the office.

The anti-blocking platform 200 comprises a computer processor and memory interconnected by a bus provided with interfaces for peripheral devices, human-machine interfacing and network interfacing. Embodiments of the invention provide methods, system frameworks, and a computer usable medium storing computer readable instructions for configuring network elements to maintain service throughout a network. The invention may be implemented as a modular framework and deployed as software as an application program tangibly embodied on a program storage device. The application code for execution can reside on a plurality of different types of computer readable media known to those skilled in the art.

It should be noted that the invention is not limited to any particular software language. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Figure 2:
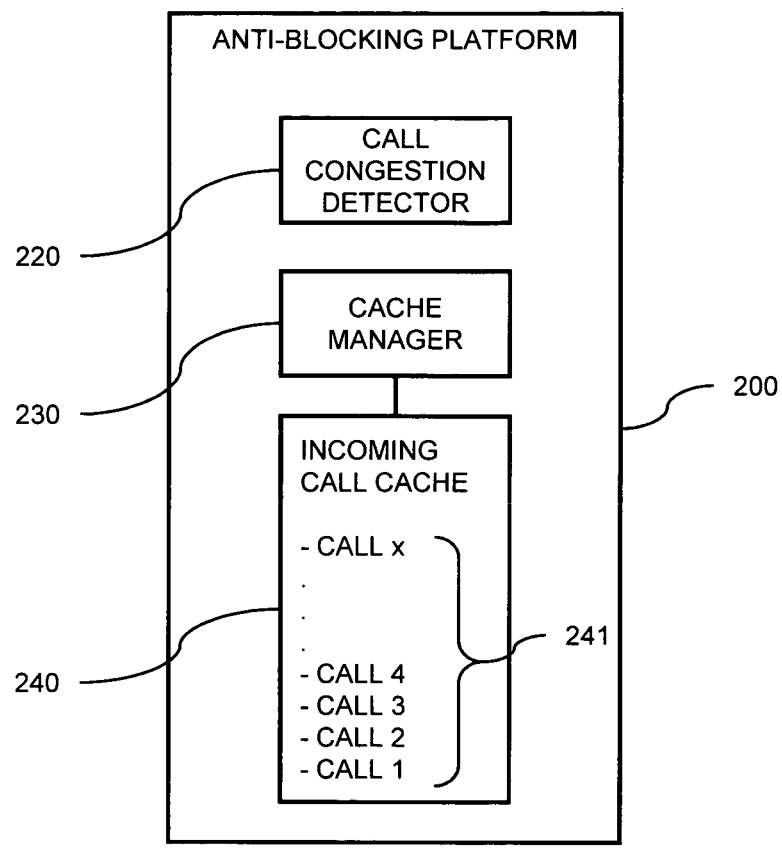
FIG. 2 is a schematic diagram of an anti-blocking platform according to one embodiment of the invention.

As shown in FIG. 2, the anti-blocking platform 200 of the invention includes a call congestion detector 220, a cache manager 230 and an incoming call cache 240. Each of those elements may comprise software modules running on one or more processors, or hardware devices, or combinations of software modules and hardware devices. The elements cooperate as described below to reduce or eliminate call blocking at the network element 150.

The call congestion detector 220 initiates operation of the other elements of the anti-blocking platform 200 upon detecting that capacity has been exceeded at the network element 150 (FIG. 1). The call congestion detector 220 may conclude that call congestion exists based on a comparison of a measured number of incoming calls to a threshold value. The threshold value may be set to a point just below the capacity of the network element 150 so that the anti-blocking steps of the invention may be taken before call blocking actually begins. Alternatively, the network element 150 may send a message to the call congestion detector indicating that the network element is reaching or has reached a congested state; i.e., call blocking has occurred or is about to occur. In yet another alternative, the call congestion detector 220 receives a message from elsewhere in the network indicating that congestion in the network element 150 has occurred. For example, one or more blocked calls may be detected by the originating central office, and notification of those blocked calls may be sent to the call congestion detector.

Returning to FIG. 2, the anti-blocking platform also includes an incoming call cache 240 and cache manager 230. The exemplary incoming call cache 240 of FIG. 2 comprises a computer memory stack having a data structure facilitating first-in, first-out (FIFO) data handling. Each memory location in the stack has storage for the call routing information of a single call. For example, in the illustrated cache, routing information for call 1 through call x are stored in sequential locations in the cache in the order that the calls were received. The "memory stack" configuration shown in FIG. 2 is merely illustrative of the operation of the first-in, first-out functionality of the database. The database preferably has the additional capability of randomly accessing and deleting any data item in any position in the cache, as described below.

The cache manager 230 oversees the storage and retrieval of call routing information from in the cache 240. Upon notification by the call congestion detector 220 that a call cannot be processed by the network element 150 due to congestion, the cache manager 230 transfers call routing information associated with the call to the cache 240, for storage in the stack 241. The cached calls are not connected to their destination, but are not blocked and are not released from the originating switch.

When an incoming call is cached, a message may be sent to the originating station to inform the caller that the call is being processed. For example, an automated voice response (AVR) system may be used to play an audio message to the caller stating that the connection has been delayed, and that the call is expected to be connected in x seconds. The message may alternatively simply state that the call is in progress.

The cache manager automatically removes those calls form the cache that have been dropped by the caller. For example, if an on-hook condition is detected on the calling circuit, the cache manager removes that call from the stack, regardless of where in the stack that call currently resides, and regardless of whether capacity currently exists to connect the call.

In one embodiment, the decision to cache the call routing information of a particular call is made separately for each call, based on whether that call would be blocked if no action were taken. Alternatively, when a threshold call volume is reached, calls may be cached in blocks or chosen randomly for caching to bring call volume down to a manageable level. Calls may be chosen for caching based on other parameters, such as a level of service to which the caller or the callee has subscribed.

The information stored in the cache includes all information required for routing the call. That typically includes a destination address such as a phone number, together with caller identification information and any other routing information required by the network.

After the routing information for one or more calls is placed in the cache, the cache manager monitors traffic through the network element to determine whether there is excess capacity to handle any of the calls in the cache. When capacity is found to exist to handle a call in the cache, the routing information for that call is read from the cache and is removed from the cache memory. In a preferred embodiment of the invention, the call that has been in the cache the longest is selected for connection. The routing information read from the cache is used in connecting the call to the called station. Before connecting the call, the connection to the calling station may be checked to confirm that the calling party has not dropped the call.

Figure 3:
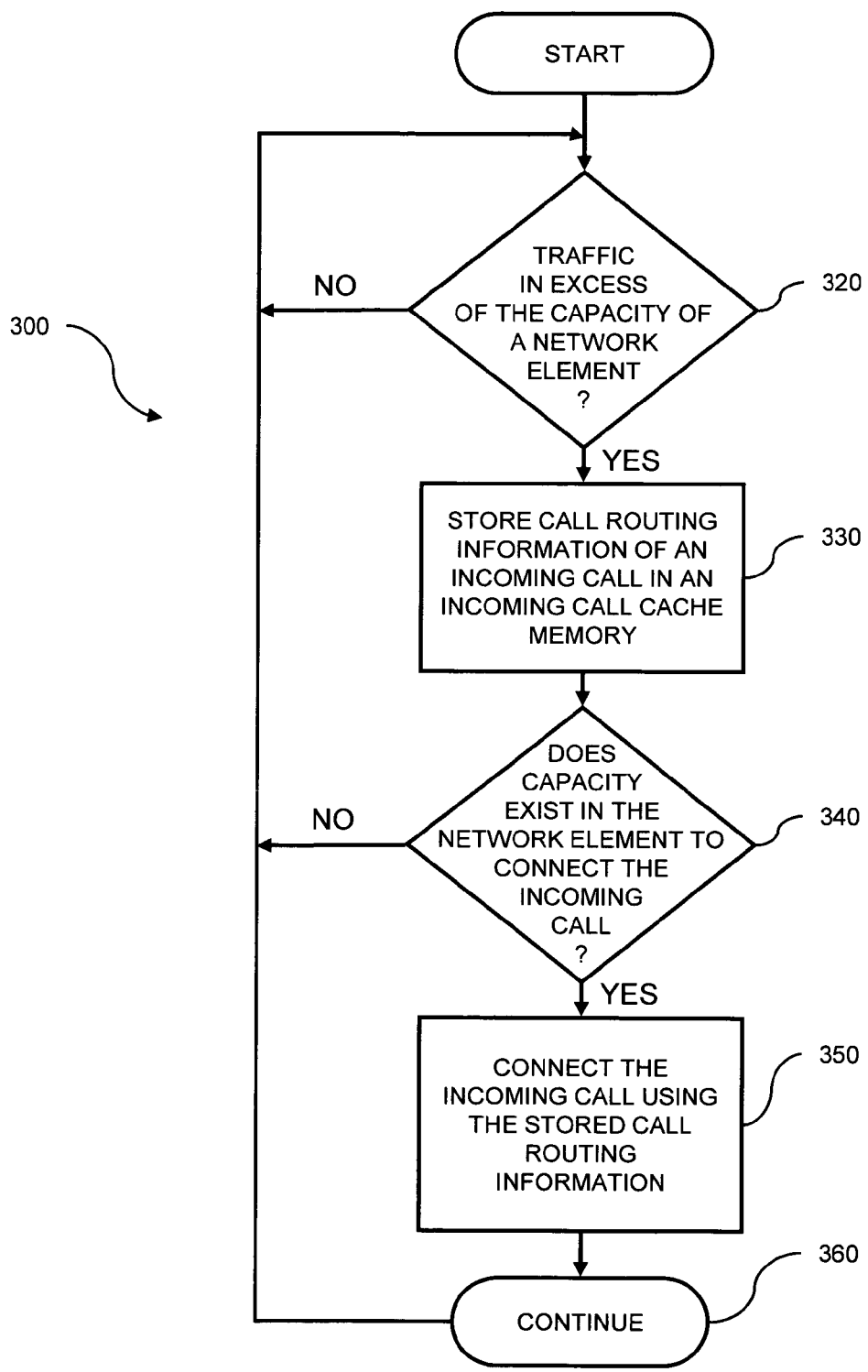
FIG. 3 is a flow chart representing a method according to one embodiment of the invention.

A method 300 to be executed by one or more processors in accordance with the invention is shown schematically in the block diagram of FIG. 3. It is first determined (step 320) whether incoming traffic is in excess of the capacity of a network element. As noted, that determination may be made by monitoring the volume of calls at the network element, or may be made by receiving a notification of a dropped call from elsewhere in the network. If traffic is not exceeding capacity, then the monitoring continues.

If it is determined that an incoming call is in excess of the capacity of a network element, then routing information for the call is stored (step 330) in the incoming call cache memory. The system then monitors whether capacity is restored in the network element to connect calls in the cache (step 340). If not, then the system continues to monitor for congestion (step 320) and to cache excess calls (step 330).

If capacity is found in the network element to connect a call stored in the cache, then the call is connected (step 350) using the routing information stored in the cache. Calls are thereby effectively "slowed down" by storing them temporarily in the cache memory.

An alternative or supplemental technique according to the present invention is the provision of another trunk that automatically absorbs traffic when traffic reaches a certain limit on an alternate route of a switch. The additional trunk would route the calls to their destinations. The additional trunk need only be provided on the trunk groups that are already known to block calls under heavy call volume such as that caused by an auto-dialer. For example, this is known to have happened in certain trunk groups at a rate of 4 out of 5 months. Additionally, surveillance teams may identify additional problem trunks.

A large contributing factor to the blocked call problem is the fact that the 'dead number' database is not typically kept up to date. Under ideal conditions, when a number is disconnected it is deleted or otherwise removed from the relevant databases to keep it out of circulation until it is needed. For various reasons, however, that does not occur. In an optional step of the method of the invention, a report is run every week, every other week or even every month to reconcile those numbers. By removing "dead numbers" from the databases used by auto-dialers, those calls that are attributed to auto-dialers could be cut in half or more and the blocking thereby substantially reduced or eliminated.

The methods and apparatus of the present invention provide a great amount of robustness to a telecommunications network. By reducing or eliminating blocked calls, the invention additionally assures that the network provider meets the stated metrics of the network service. The invention also saves the time and effort expended by network providers in investigating issues relating to blocked calls. One occurrence of this type can take hours to investigate and reconcile. Regional network services providers often have 10-15 or more cases to deal with simultaneously.

As noted above, the current approach to alleviating the problem of call blocking is to add alternate routes. The present invention improves over that technique by avoiding the man hours of the facilities group and the other costs of physically putting in the alternate route or extra trunk. Adding an alternate route increases the workload of the translations group, the design group, testing group, monitoring group and so forth.

Using the cache system of the present invention is considerably less expensive than the addition of alternate routes, because the cache system uses memory chips instead of physical call capacity. The initial outlay of monies for the equipment, programming and software part is minimal compared to installing additional physical plant. Because the problem of dropped calls often appears suddenly as equipment is added to a network, it must be dealt with on an emergency basis, often with great cost.

The cache system of the invention is an attractive selling point to new network customers, and is a potential product or service that may be sold to other network providers dealing with the same problem.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. For example, while the method of the invention is described herein with respect to a telecommunications network having a SS7 signaling system, the method may be used with other types of networks having other signaling systems, both in-band and out-of-band. The described embodiments are merely illustrative of the principles of the present invention and various modifications may be implemented by those skilled in the art without departing from the scope and spirit of the invention.

What is claimed is:

1. A method for reducing call blocking of calls that exceed a processing capacity of a tandem switch element in a telecommunications network, the method comprising:
    by a call congestion detector associated only with the tandem switch element, receiving a message from elsewhere in the telecommunications network indicating incoming traffic in excess of the processing capacity of the tandem switch element;
    in response to receiving the message, storing call routing information of an incoming call in an incoming call cache memory, the call routing information including a destination address of the call and a caller identification;
    determining that capacity exists in the tandem switch element to connect the incoming call; and
    connecting the incoming call using the call routing information.

2. The method of claim 1, wherein the tandem switch element is a tandem switch office.

3. The method of claim 1, wherein connecting the incoming call further comprises:
    selecting the call from the cache on a first-in, first-out basis.

4. The method of claim 1, wherein detecting an incoming call in excess of the capacity further comprises:
    determining that a call volume in the tandem switch element has exceeded a threshold.

5. The method of claim 1, wherein detecting an incoming call in excess of the capacity further comprises:
    determining that call volume in the tandem switch element has exceeded a capacity of the tandem switch element.

6. The method of claim 1, further comprising:
    after connecting the call, removing the call routing information for the incoming call from the cache memory.

7. The method of claim 1, further comprising:
    playing a message to an originator of the incoming call regarding call status.

8. The method of claim 1, further comprising:
    determining that an originator has dropped the incoming call; and
    removing the call routing information of the incoming call from the incoming call cache memory.

9. The method of claim 1, wherein the call routing information is an Initial Address Message (IAM).

10. The method of claim 1, wherein the tandem switch element is a Signaling System 7 (SS7) switch.

11. An anti-blocking platform for reducing call blocking of calls that exceed a processing capacity of a tandem switch element in a telecommunications network, the platform comprising:
    a call congestion detector associated only with the tandem switch element, the call congestion detector comprising a processor and a computer-readable medium having instructions stored thereon for execution by the processor to receive a message from elsewhere in the telecommunications network indicating incoming traffic in excess of the processing capacity of the tandem switch element;
    an incoming call cache memory; and
    a cache manager comprising a processor and a computer-readable medium having instructions stored thereon for execution by the processor to perform operations comprising:
    receiving from the call congestion detector an indication that incoming traffic exceeds the capacity of the tandem switch element;
    storing call routing information of an incoming call in the incoming call cache memory, the call routing information including a destination address of the call and a caller identification;
    determining that capacity exists in the tandem switch element to connect the incoming call; and
    based on determining that capacity exists, connecting the incoming call using the call routing information.

12. The anti-blocking platform of claim 11, wherein the tandem switch element is a tandem switch office.

13. The anti-blocking platform of claim 11, wherein connecting the incoming call further comprises:
    selecting the call from the cache on a first-in, first-out basis.

14. The anti-blocking platform of claim 11, wherein the call congestion detector detects an incoming call in excess of the capacity of the tandem switch element based on a call volume threshold.

15. The anti-blocking platform of claim 11, wherein the call congestion detector detects an incoming call in excess of the capacity of the tandem switch element by determining that call volume in the tandem switch element has exceeded a capacity of the tandem switch element.

16. The anti-blocking platform of claim 11, wherein the operations further comprise:
    after connecting the call, removing the call routing information for the incoming call from the cache memory.

17. The anti-blocking platform of claim 11, wherein the operations further comprise:
    playing a message to an originator of the incoming call regarding call status.

18. The anti-blocking platform of claim 11, wherein the operations further comprise:
    determining that an originator has dropped the incoming call; and
    removing the call routing information of the incoming call from the incoming call cache memory.

19. The anti-blocking platform of claim 11, wherein the call routing information is an Initial Address Message (IAM).

20. The anti-blocking platform of claim 11, wherein the tandem switch element is a Signaling System 7 (SS7) switch.

* * * * *